US009244678B1

(12) United States Patent
Hatch et al.

(10) Patent No.: US 9,244,678 B1
(45) Date of Patent: *Jan. 26, 2016

(54) MANAGING CONTENT VERSIONS

(71) Applicant: AUDIBLE, INC., Newark, NJ (US)

(72) Inventors: Steven D. Hatch, Maplewood, NJ (US);
Guy A. Story, Jr., New York, NY (US);
Edward J. Walloga, Wyckoff, NJ (US)

(73) Assignee: Audible, Inc., Newark, NJ (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/647,295

(22) Filed: Oct. 8, 2012

(51) Int. Cl.
*G06F 9/44* (2006.01)
*G11B 27/02* (2006.01)
*G11B 27/031* (2006.01)

(52) U.S. Cl.
CPC *G06F 8/71* (2013.01); *G11B 27/02* (2013.01); *G11B 27/031* (2013.01); *Y10S 345/901* (2013.01)

(58) Field of Classification Search
CPC ............ G06F 8/71; G11B 27/02; G11B 27/031–27/038; Y10S 345/901
USPC ............. 386/201, 241, 248; 700/94; 707/999.203; 709/203, 217, 219, 246, 709/248; 715/229, 716, 723, 727; 717/170
See application file for complete search history.

(56) References Cited

U.S. PATENT DOCUMENTS

| | | | |
|---|---|---|---|
| 6,154,757 A | 11/2000 | Krause et al. | |
| 8,180,469 B1* | 5/2012 | Fitch et al. | 700/94 |
| 8,478,662 B1* | 7/2013 | Snodgrass et al. | 705/26.7 |
| 8,832,319 B2 | 9/2014 | Kessel et al. | |
| 8,904,304 B2 | 12/2014 | Farago | |
| 2003/0203343 A1 | 10/2003 | Milner | |
| 2006/0130121 A1* | 6/2006 | Candelore et al. | 725/145 |
| 2008/0250080 A1* | 10/2008 | Arrasvuori et al. | 707/203 |
| 2009/0240671 A1 | 9/2009 | Torres et al. | |
| 2009/0313546 A1* | 12/2009 | Katpelly et al. | 715/723 |
| 2011/0099071 A1* | 4/2011 | Johnson | 705/14.64 |
| 2011/0208614 A1 | 8/2011 | Tom | |
| 2011/0289444 A1 | 11/2011 | Winsky | |
| 2012/0135684 A1* | 5/2012 | Shrum et al. | 455/41.2 |
| 2012/0233539 A1 | 9/2012 | Reed | |
| 2013/0013991 A1 | 1/2013 | Evans | |
| 2013/0041747 A1 | 2/2013 | Anderson et al. | |
| 2014/0038154 A1* | 2/2014 | Brownlow et al. | 434/317 |
| 2014/0074855 A1* | 3/2014 | Zhao et al. | 707/746 |
| 2014/0250219 A1* | 9/2014 | Hwang | 709/224 |

* cited by examiner

*Primary Examiner* — Brian J Gillis
*Assistant Examiner* — Gil H. Lee
(74) *Attorney, Agent, or Firm* — Knobbe Martens Olson & Bear LLP

(57) ABSTRACT

Items of content may be available in any of a number of versions. Major aspects of each content version, such as overall plot and major characters, may generally overlap. However, minor aspects, such as level of description, minor characters, or sub-plots may vary between versions. Accordingly, systems and methods are provided for managing playback of multiple content versions, and enabling users to switch between such content versions. In some embodiments, a playback path including portions of multiple content versions may be provided, such that a user may consume only desired portions of each content version. In other embodiments, a determined playback path may be utilized to create a customized content version, which may be provided to a user.

29 Claims, 9 Drawing Sheets

MANAGING CONTENT VERSIONS

BACKGROUND

Generally described, computing devices may convey items of digital content to users. For example, computing devices may visually convey items of content such as animations, electronic books, electronic periodicals, movies, television programs, multi-media content, and portions thereof on an electronic screen or touchscreen. Computing devices may also direct audible output through headphones or speakers to convey items of audible content such as audiobooks, songs, movies, television programs, multi-media content, and portions thereof.

In some instances, a particular item of content may be available in a variety of versions. While the subject matter and general progression of each content version may the same, each version may differ in one or more ways. For example, a novel may be available in an unabridged version, an abridged version, or a summary version. Illustratively, the unabridged version may correspond to an original author's work. Similarly, the abridged version may correspond to a version of that original work that has been edited to condense the work, or to make the original work easier to consume. Further, the summary version may correspond to a very condensed version that may omit significant portions of the original work. In some instances, expanded versions of a content item may also be available. For example, "extended editions" or "director's cuts," may reincorporate material initially omitted from a standard version of the content item.

A given user may have different preferences regarding which version of a content item to consume. For example, a user concerned with authenticity may elect to consume the original or unabridged convent version, while a user concerned with the complexity or length of the content may elect to consume the abridged content version. Similarly, a user concerned only with the basic outline of the content may elect to consume the summarized version.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
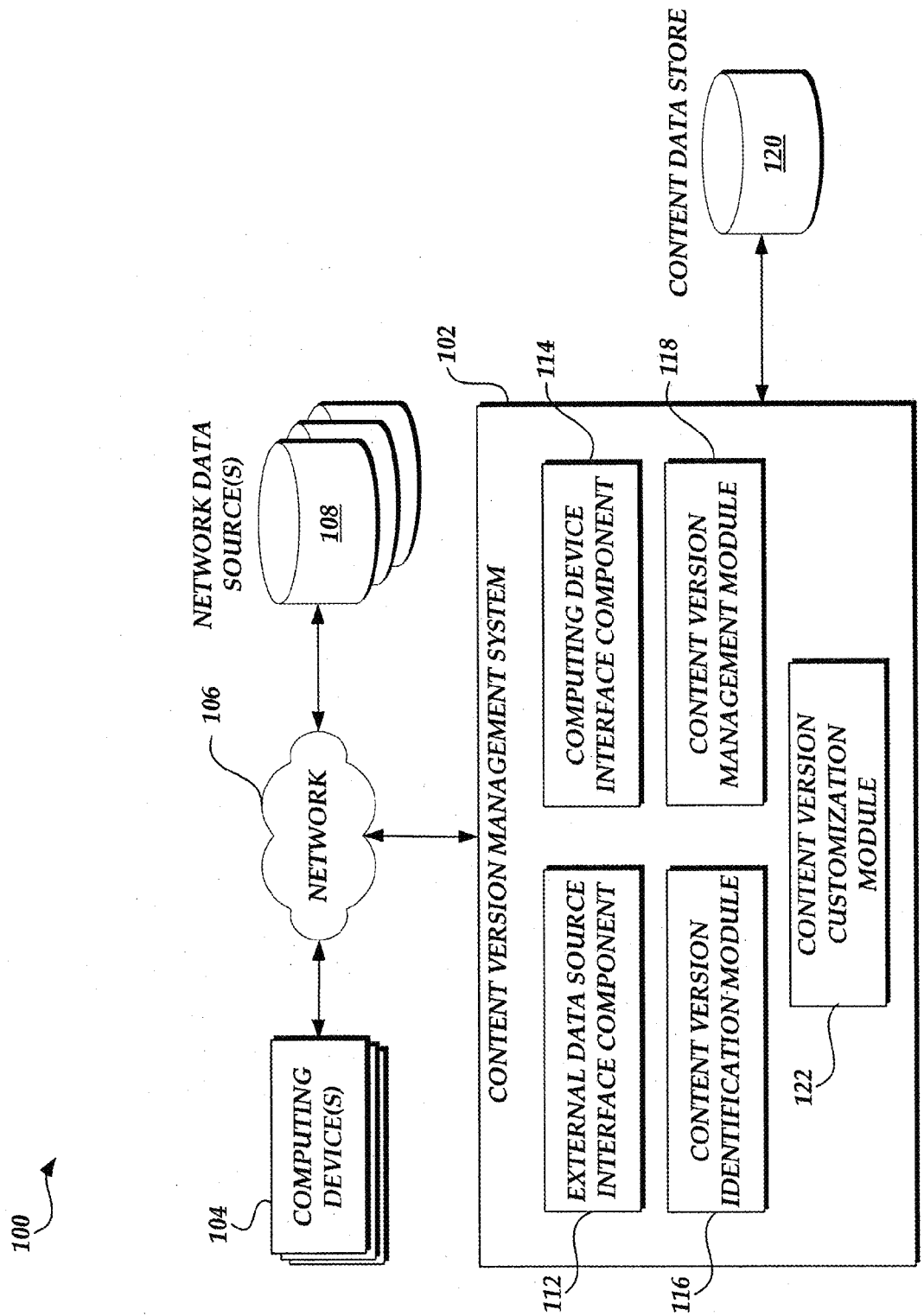
FIG. 1 is a schematic block diagram of an illustrative network environment in which a content version management server enabling playback of multiple content versions may operate.

Generally described, aspects of the present disclosure are directed to managing playback of multiple versions of an item of content. For example, a given item of content, such as an electronic book (e-book), may be available in an unabridged (e.g., original or standard) version, an abridged version, a summary version, and an expanded version. Each version of a content item may be separately obtainable by a user, and each user may have different preferences with regard to which version is consumed. However, in some instances, a version may not be available which corresponds precisely to a user's preferences. For example, a user may find the unabridged content version too long, while also finding the abridged content version too brief. Accordingly, systems and methods are disclosed herein enabling a user to alternate, interchange, or switch between consumption of multiple content versions. Still further, systems and methods are disclosed herein for determination of a customized playback path (e.g., including portions of multiple content versions), which may be utilized by a user to view corresponding content portions included within the playback path. Illustratively, by use of a customized playback path, a user may be enabled to consume portions of multiple content versions corresponding to the playback path, without being required to manually alternate between multiple content versions.

In general, any given content item may correspond to multiple content versions. Each content version may share common primary aspects, such as overall plot, progression, major characters, and general subject matter, but may differ in one or more secondary aspects, such as the amount of descriptive material or dialogue and inclusion of secondary characters or sub-plots. For example, an unabridged content version may include a large amount of descriptive material and dialogue omitted from an abridged or summarized version. Further, an expanded version may include additional characters or sub-plots removed from the unabridged, abridged, or summarized versions. Due to these differences, the duration and complexity of each content version may vary widely. For example, an unabridged content version of a given e-book may be 1000 or more pages, the abridged version may be 500 pages, and the summarized version may be only 20 pages.

Because of the large differences between versions of a content item, a user consuming a given content item may find it beneficial to switch between consumption of multiple versions of the content item at their discretion. For example, a user may begin consumption of the unabridged version of a content item, but thereafter find the unabridged version too complex, too lengthy, or generally boring. Accordingly, the user may desire to switch to consuming the abridged content version. As a further example, a user may be consuming an abridged content version, but become dissatisfied with the work in general. However, the user may not wish to stop consuming the content without knowing how the content ends. Accordingly, the user may desire to switch to consuming the summary content version, in order to receive general details of the content item. As a still further example, a user may be consuming a given version of a content item, but desire further detail or information regarding the work or an increased level of complexity. Accordingly, the user may desire to switch from consumption of an abridged content version to consumption of an unabridged content version, or from consumption of an unabridged content version to consumption of an expanded content version, etc.

As may be seen from the examples given above, there may be a variety of instances or situations in which a user would desire to switch between versions of a content item. However, it may be detrimental to require a user to locate the point in a new version that corresponds to a most recently consumed point in the currently consumed content version. Accordingly, it may be beneficial to enable a user to begin consumption of any new content version from a point corresponding to a last consumed portion of another content version. In this manner, a user's progress through the content item may be preserved.

Accordingly, a content version management server may be provided enabling synchronization of multiple versions of a given content item. Illustratively, the content version management system may store or otherwise have access to a number of different versions of a content item, and provide at least one version of the content item to a user for output (e.g., display on an e-book reader, playback on an audio device, etc.). Thereafter, the content version management server may receive a request from a user (e.g., via the e-book reader or audio device) to switch to consumption of an alternate content version. In response, the content version management server may provide information to the user's device enabling consumption of the alternate content version from a point corresponding to the last consumed point of the previous version. In some embodiments, the provided information may correspond to the alternate content version itself, or a portion of the alternate content version (e.g., beginning at a point corresponding to the last consumed point of the previous version). In other embodiments, the provided information may correspond to mapping information mapping the two content versions (e.g., via a page-to-page mapping, location-to-location mapping, time stamp-to-time stamp mapping, etc.). Accordingly, as will be described in more detail below, the user's device may utilize the received information in order to playback the alternate content version a point corresponding to the last consumed point of the previous content version.

In some embodiments, a content version management server may receive mapping information for multiple versions of a content item from external sources. For example, a creator, editor, publisher, or other entity associated with a content version may provide information mapping the content version to additional content versions. Illustratively, a creator of an abridged content version may provide the content version management server with information mapping the abridged content version to the unabridged content version (or any other content version). In further embodiments, mapping information may be generated by other parties, such as an entity associated with the content version management server, or users of the content version management server. For example, in some embodiments, multiple users of the content version management server (or a related service) may submit suggested mappings between versions, and the content version management server may select appropriate mappings from among the suggestions submitted. In still more embodiments, the content version management server may fully or partially automate creation of mapping between content versions, as will be described in more detail below.

Further, in some instances, it may be beneficial to modify versions of an item of content based on one or more factors, such as user preferences or past history. Illustratively, in some instances, a user may consume an abridged content version until a given point within the content item, and thereafter consume the unabridged content version. However, characters, sub-plots, or other aspects of the content that are discussed within the unabridged content version may not have been introduced within the consumed portion of the abridged content (e.g., for the sake of brevity). In these instances, it may be unsettling for a user to be presented with references to the omitted aspects while consuming the unabridged content version, especially when the aspects are not essential to enjoyment of the unabridged content version. Accordingly, a content version customization server may be provided to modify an existing content version to remove references to content aspects omitted from a previously consumed content version. For example, should a user switch from consuming an abridged content version to consuming an unabridged content version, content aspects (minor characters, sub-plots, locations, etc.) omitted from an abridged content version may be removed from the remaining portion of the unabridged content version. As will be described below, removal of content aspects may be completed either wholly or partially automatically. For example, an unabridged content version may include markers indicating aspects that are removed from one or more alternative content versions. By use of such markers, a content version customization server may generate a modified unabridged content including only a select set of content aspects.

In some embodiments, the content version customization server may further modify content versions, or modify content versions for different purposes. For example, a user may desire to consume an unabridged version of a given content item, but may desire to remove some extraneous content aspects, such as sub-plots, minor characters, locations, content types (e.g., violent, explicit, or otherwise unsuitable content), etc. Accordingly, the content version customization server may be configured to generate a modified content version, removing the undesirable aspects. Thereafter, the user may be presented with the modified content version conforming to their preferences.

Still further, in some embodiments, a user may desire to consume some portion of a first content version (e.g., an unabridged content version) and other portions of a second content version (e.g., the corresponding abridged content version). However, the user may not desire to manually switch between content versions. Further, the user may not be aware of the best locations in the content for switching between content versions. Accordingly, aspects of the present disclosure may enable creation of a customized playback path, such that playback includes portions of multiple content versions, without requiring a user to manually select the current version. For example, a user may wish to generally consume an unabridged content version, in order to avoid omission of sub-plots, characters, or other aspects. However, the user may wish to avoid lengthy descriptions that are common within the unabridged version. Accordingly, a customized playback path may generally correspond to the unabridged content version, while switching to the abridged content version during periods of lengthy description. By creating a customized playback path including portions of both content versions, the user may be presented with a seamless playback experience tailored to their preferences. As will be described in more detail below, in some embodiments, a customized content version may be generated based on a customized playback path (e.g., including only portions of content versions referenced by the customized playback path). Accordingly, a user may be presented with a content version customized to their content preferences.

Though reference may be made throughout the description to textual content items, such as e-books, the systems and methods described herein may be utilized for any content item, including textual, auditory, or visual information, or any combination thereof. Examples of such content items include, but are not limited to, e-books, reference texts, audio books, podcasts, movies, documentaries, and other videos.

With reference now to FIG. 1, a block diagram depicting an illustrative content version management environment 100 for use in identifying a number of content versions corresponding to a given content item, generating version synchronization information for enabling alternating playback between content versions, and managing the content versions will be described. As illustrated in FIG. 1, the content version management environment 100 includes a related content version management system 102, one or more computing devices 104, and one or more network data sources 108 in communication via a network 106, as well as a content data store 120 in communication with the content version management system 102 (e.g., via a network). The network 106, in addition to any of the networks described herein, may be any wired network, wireless network or combination thereof. In addition, any of the networks described herein may be a personal area network, local area network, wide area network, cable network, satellite network, cellular telephone network, etc., or any combination thereof.

As illustrated in FIG. 1, the content version management environment 100 can include one or more computing devices 104 for presenting content to a user. In an illustrative embodiment, the computing devices 104 can include various hardware and/or software components for obtaining and presenting digital content to a user, including, but not limited to, browser software applications, image viewing software applications, electronic publication viewing software applications, audio and/or video media playing software applications, and the like. The computing devices 104 can correspond to a wide variety of devices or components that are capable of initiating, receiving or facilitating communications over a communication network and/or presenting content. The computing devices 104 can include, but are not limited to, a laptop, personal computer, a tablet computer, personal digital assistant (PDA), hybrid PDA/mobile phone, mobile phone, electronic book reader, digital media player, television, DVR, one or more processors, integrated components for inclusion in computing devices, appliances, electronic devices for inclusion in vehicles or machinery, gaming devices, and the like.

With continued reference to FIG. 1, the content version management system 102 can include an external data source interface component 112, a computing device interface component 114, a content version identification module 116, a content version management module 118, and a content version customization module 122. Illustratively, the external data source interface component 112 may be utilized for obtaining content version information from network-based resources, such as the network data sources 108. Further, the computing device interface component 114 may be utilized for obtaining content version information from computing devices 104. The content version information obtained from the network data sources 108 and/or the computing devices 104 may include any information that can be used to identify multiple content versions corresponding to a content item. For instance, the content version information may include information that identifies a content version and/or information related to the content version itself.

The content version management system 102 can also include a content version management module 116 for identifying multiple content versions corresponding to a given content item, identifying a computing device 104 to receive synchronization information for enabling switching between content versions, causing transmission of synchronization information to one or more computing devices 104 via the network 106, or any combination thereof. The external data source interface component 112 and the computing device interface component 114 may be utilized to cause the transmission of information to the one or more network data sources 108 and/or one or more computing devices 104, respectively.

The content version management system 102 can also include a content version identification module 116 for processing the content information from the network data sources 108 and determining which multiple content versions corresponding to a given item of content. The content version identification module 118 may use a product identifier and/or metadata (e.g., title, author, edition, etc.) related to a content version in order to determine other content versions which correspond to a single content item. For instance, such information can be used to determine an abridged or summarized edition exists that corresponds to *The Count of Monte Cristo* e-book or audio book. In some implementations, the content version identification module 118 may further process the content version information to identify multiple content versions by applying filtering, spell/grammar check, and any other suitable automated algorithms. In addition, the content version identification module 116 can incorporate additional reference materials to identify multiple content versions, for instance, by accessing a uniform resource identifier.

Though automated mechanisms for identifying multiple content versions corresponding to a content item are described herein, embodiments of the present disclosure may utilize manual or semi-manual methods in conjunction with or exclusive of automated mechanisms. For example, in some embodiments, one or more parties may manually classify a content version as corresponding to a given content item. Accordingly, an author, producer, editor, publisher, or other entity associated with an abridgement or summarization of a content item may classify the abridgement or summarization as an additional version of the content item. In some embodiments, general users of a system (such as the content version management system 102) may identify content versions as corresponding to a given content item. One skilled in the art will appreciate that a multitude of voting or crowd-sourcing techniques may be utilized to aggregate or filter input from a variety of sources.

However, despite content versions corresponding to a common content item, it is unlikely that any content version would correlate exactly to another content version. For example, the abridged version of *The Count of Monte Crist* may remove minor aspects present in the unabridged version, such as excessive description or dialogue, minor characters, sub-plots, locations, etc. Due to the existence of such uncorrelated portions of corresponding content versions, the content version identification module 116 can be configured to identify corresponding content versions despite the presence of mismatching portions.

After identifying multiple content versions corresponding to a given content item (e.g., an unabridged version of *The Count of Monte Cristo* eBook and a corresponding abridged version), the content version management system 102 may generate synchronization information enabling interchangeable playback of the content versions. For example, synchronization information may map portions of a first content version to portions a second content version (e.g., a page, paragraph, word number, or positions in a first version with a corresponding page, paragraph, word number, or position in a second version).

As described above, it is unlikely that different versions of a content item contain exactly the same material. However, despite differences between content versions, two or more versions may include large portions of similar or identical material. Accordingly, in some embodiments, the content version identification module 116 may detect mismatches between multiple content versions using algorithms that solve "longest common sequence" problems, an implementation of which can be found, for example, in the UNIX "diff" operation. The content version identification module 116 can then generate content synchronization information for the correlated portions of the different versions and provide the content synchronization information to the user's computing device 104 for use when interchangeably presenting different content versions.

For passages of multiple content versions with small-scale modifications, the content version identification module 116 may correlate the modified material and generate an indicator that these portions include some mismatches. For example, the content version identification module 116 may attempt to match content at a small scale (e.g., at a word level). Since missing or added passages can include larger portions (e.g., whole sentences, paragraphs, pages, or chapters) that do not match, a passage mismatch score indicating the frequency of mismatches can be computed for sentences, paragraphs, and/ or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known content versions) can be identified. These sequences may represent portions of a content version that should not be synchronized with other content versions. The high mismatch passages can be removed in either or both content versions, and matching can be reattempted at a smaller scale (e.g., at the word level). Metadata can be generated based on the correlation(s) to determine alignment points for the content version synchronization information. The metadata may also include information identifying reference points in at least one of the content versions at which a matching portion begins/ends.

In some embodiments, certain portions or classes of portions of a content version may be more likely to correlate to another content version than other portions or classes of portions. For example, quotations or dialog within a content version may be more likely to directly correspond to quotations or dialog within a second content version than descriptive language. Illustratively, an abridged content version may maintain a majority of dialogue, but remove descriptive language (e.g., to reduce length). As such, in some embodiments, the content version identification module 116 may attempt to match quotations or dialogue within a first content version to similar or identical quotations or dialogue within a second content version. Further, formal names (e.g., character names or place names) may be indicative of a correlation between multiple content versions. Illustratively, a character may be introduced at a certain point within the content version (e.g., at 30% into the duration of the content version). As such, the content version identification module 116 may be configured to locate the first introduction of the character into a content version, and attempt to map this location to the character's introduction within a second content version. For example, the content version identification module 116 may attempt to map the introduction (or removal) of non-standard words or phrases (e.g., non-dictionary words or phrases) in a first content version over time, and compare an additional mapping created based on a second content version. Similarities in the mappings may indicate points within the first content version and the second content version that should be correlated.

As described above with respect to identification of content versions, though automated mechanisms are described herein, embodiments of the present disclosure may utilize manual or semi-manual methods in conjunction with or exclusive of automated mechanisms. For example, in some embodiments, one or more parties may manually create synchronization information for a multiple content versions (e.g., a producer, a distributor, or an end user). One skilled in the art will appreciate that a multitude of voting or crowd-sourcing techniques may be utilized to aggregate or filter input from a variety of sources.

With continued reference to FIG. 1, the content version management system 102 can further include a content version management module 118 for identifying multiple content versions corresponding to a content item, identifying a computing device 104 to receive content version information, causing transmission of content versions and or content version synchronization information to one or more computing devices 104 via the network 106, or any combination thereof. Moreover, in some embodiments, the content version management module 118 may further be configured to determine customized playback paths, including portions of multiple content versions. These playback paths may be based, for example, on user preferences, and may combine or interchange portions of a number of content versions in order to create a complete content version that conforms to a user's preferences. Illustrative embodiments of interactions including the content version management module 118 will be described in more detail with respect to FIGS. 5 and 7 below.

In addition, the content version management system 102 may include a content version customization module 122 for customizing or otherwise modifying content versions corresponding to a content item. As will be described in more detail below, customization of a content version may be beneficial when switching between content versions, in order to remove references or distinctions that may otherwise confuse a user. For example, a user switching from a less descriptive content version (e.g., an abridged version) to a more descriptive version (e.g., an unabridged version) may be confused when presented with references to aspects (e.g., characters, sub-plots, locations, etc.) that were omitted from the less descriptive content version. Accordingly, it may be beneficial to modify the more descriptive version in order to remove such references, especially in instances where the references are no longer relevant or only tangentially relevant. Still further, customization of content versions may be beneficial where no available content version conforms to a user's preferences. Illustratively, a user may desire a content version that is near to, but no more than 1000 pages. However, the two available content versions may contain 1058 pages and 500 pages, respectively. Though the user may be presented with the 500 page content version, this would deviate significantly from their preference. Accordingly, it may be beneficial to customize the 1058 page content version (e.g., to remove extraneous material) to provide the user with a customized content version that more closely mirrors their preferences. As yet another example, customization of content may be beneficial where a user considers one or more aspects of a content item undesirable. Illustratively, a user may wish to remove certain characters, locations, sub-plots, or types of content (e.g., explicit or unsuitable content) from a content item. As such, in some embodiments, the content version customization module 122 may be configured to locate and attempt to remove undesirable content aspects from a content item. Illustrative embodiments of interactions including the content version customization module 122 will be described in more detail with respect to FIGS. 5 and 7 below.

In addition, the content version management system 102 can further be associated with the content data store 120 for storing content version information obtained by the external data source interface component 112, utilized and/or generated by the content version management system 102. The content data store 120 may store content version information used to determine whether content versions correspond to a given content item, synchronization information relating multiple content versions, and additional information. For instance, the content data store 120 may store a list, database, or other suitable data structure that identifies corresponding content versions as determined by the content version management system 102.

The content version management system 102 may be operable on one or more computing devices, such as virtual or physical server computing devices, cloud nodes, client computing devices, and/or mobile computing devices. Additionally, the external data source interface component 122, the computing device interface component 114, the content version identification module 116, the content version management module 118, and/or the content version customization module 122 may be implemented in a single computing device or across multiple computing devices. Likewise, although the content data store 120 is illustrated as local to the content version management system 102, the content data store 120 can correspond to a distributed data store and/or a network based data store. The content version management system 102 may include any one of a number of additional hardware and/or software components that would be utilized in the illustrative computerized network environment to carry out the illustrative functions of the content version management system 102 and/or any of the individually identified components.

Figure 2:
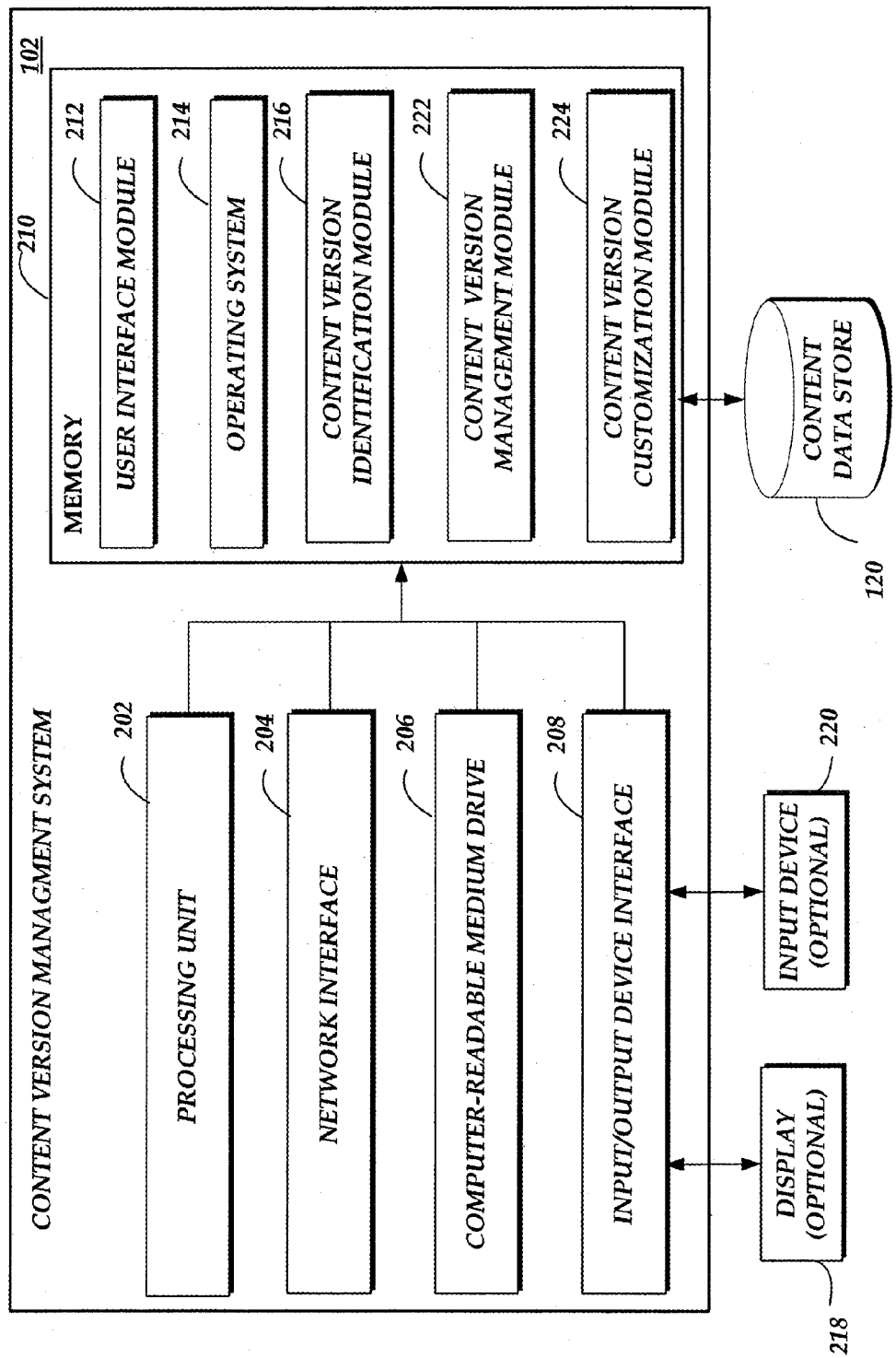
FIG. 2 is a schematic block diagram of an illustrative content version management server of FIG. 1.

FIG. 2 depicts an illustrative general architecture of a content version management system 102 of FIG. 1. The general architecture of the content version management system 102 depicted in FIG. 2 includes an arrangement of computer hardware and software components that may be used to implement aspects of the present disclosure. The content version management system 102 may include more (or fewer) components than those shown in FIG. 2. As illustrated, the content version management system 102 includes a processing unit 202, a network interface 204, a computer readable medium drive 206, an input/output device interface 208, an optional display 218, and an optional input device 220, all of which may communicate with one another by way of a communication bus. The network interface 204 may provide connectivity to one or more networks or computing systems. The processing unit 202 may thus receive information and instructions from other computing systems or services via a network. The processing unit 202 may also communicate to and from memory 210 and further provide output information for an optional display 218 via the input/output device interface 208. The input/output device interface 208 may also accept input from the optional input device 220, such as a keyboard, mouse, digital pen, etc.

The memory 210 may include computer program instructions that the processing unit 202 executes in order to implement one or more embodiments. The memory 210 generally includes RAM, ROM, and/or other persistent or non-transitory memory. The memory 210 may store an operating system 214 that provides computer program instructions for use by the processing unit 202 in the general administration and operation of the content version management system 102. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with one or more auxiliary data stores, such as content data store 120.

In addition to the user interface module 212, the memory 210 may include a content version identification module 216, a content version management module 222, and a content version customization module 224, any of which may be executed by the processing unit 202. In one embodiment, the content version identification module 216 implements various aspects described above with reference to the content version identification module 116 of FIG. 1. Similarly, the content version management module 222 may implement various aspects described above with reference to the content version management module 118 of FIG. 1, while the content version customization module 224 may implement various aspects described above with reference to the content version customization module 122 of FIG. 1.

While the content version identification module 216, the content version management module 222, and content version customization module 224 are shown in FIG. 2 as part of the content version management system 102, in other embodiments, all or a portion of a content version identification module 216, the content version management module 222, and/or content version customization module 224 may be a part of one or more computing devices 104. For example, in certain embodiments of the present disclosure, the computing devices 104 may include several components that operate similarly to the components illustrated as part of the content version management system 102, including a user interface module, content version identification module, content version management module, content version customization module, processing unit, computer readable medium drive, etc. In such embodiments, the computing devices 104 may communicate with a content data store, such as the content data store 120, and the content version management system 102 may not be required.

Figure 3A:
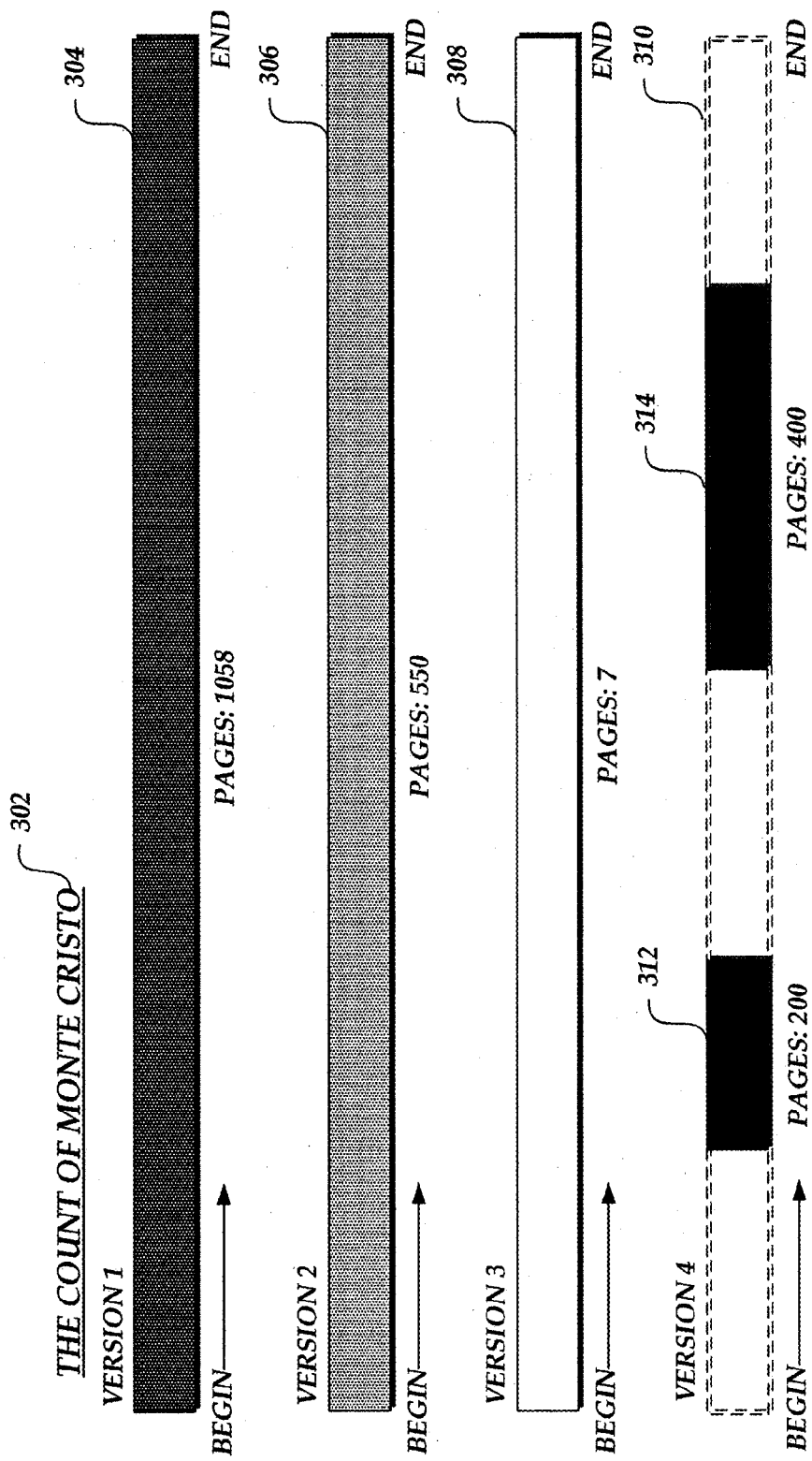
FIG. 3A is an illustrative graphical representation or visualization of multiple versions of a content item, which may be managed by a content version management server of FIG. 1.

FIG. 3A is an illustrative graphical representation or visualization of multiple versions of a content item. As shown in FIG. 3A, the content item corresponds to the e-book *The Count of Monte Cristo*. Each content version 304-310 represents a distinct version of the content item. For example, the content version 304 ("Version 1") may correspond to an unabridged or "original" version of the e-book. The content version 304 may be relatively lengthy when compared with alternative content versions, as represented in FIG. 3 by the relatively dark shade of the graphical representation of content version 304. Illustratively, content version 304 may include 1058 pages of text. Similarly, content version 306 ("Version 2") may correspond to an abridged or shortened version of the e-book, and may be somewhat less lengthy than content version 304, as represented by the somewhat lighter shade of the graphical representation of content version 306. Illustratively, content version 306 may include 550 pages of text. As one skilled in the art will recognize, the abridged version of a text may generally include major aspects of the unabridged version, such as major characters, overarching plot, and general story progression, but may omit or edit minor aspects, such as sub-plots, minor characters, certain locations, lengthy description, etc. Because both content versions 304 and 306 retain major aspects and overall characteristics of *The Count of Monte Cristo*, both content versions 304 and 306 are displayed as the same length within FIG. 3A. However, this is not meant to imply that each and every aspect of the content versions 304 and 306 is the same. Similarly to the above discussed content versions 304 and 306, content version 308 may represent yet another version of The Count of Monte Cristo, such as a summary version. Content version 308 may be still shorter than either of content version 304 or 306, as represented by the still lighter graphical representation of content version 306. Illustratively, content version 308 may include only 7 pages. As discussed above, content version 308 may generally retain the major aspects of the unabridged version and abridged version, such as major characters, overarching plot, and general story progression, but may severely limit minor aspects, such as dialogue, description, minor characters, sub-plots, locations, nuances, and other minor characteristics. Accordingly, content version 308 may represent a minimum amount of information necessary to convey the e-book content.

Though described above with reference to omission or reduction of minor aspects of a content item, in some embodiments, versions may include additional information not contained within an unabridged, standard, or original version. For example, expanded versions may include additional minor aspects, such as description, dialogue, sub-plots, locations, minor characters, etc., that were removed from a standard version. Accordingly, these expanded versions may be somewhat lengthier than a standard version.

Still further, in some embodiments, versions may not represent the entirety of a content item, but may rather represent a modified version of a portion of the content item. For example, an expanded portion may be provided that includes additional description with regard to a specific portion of an e-book. Similarly, an abridged portion may be provided that reduces the level of detail or complexity with regard to a specific portion of an e-book. One example of a version that corresponds to only specific portions of a content item is graphically represented as content version 310. As seen in FIG. 3A, content version 304 of *The Count of Monte Cristo* e-book includes two distinct portions, each relatively more lengthy than corresponding portions of other versions, as represented by the very dark shade of the graphical representation of content version 310. For example, portion 312 of content version 310 may contain 200 pages, while the corresponding portion of the unabridged content version 304 may contain only 150 pages. Similarly, portion 314 of content version 310 may contain 400 pages, while the corresponding portion of the unabridged content version 304 may contain only 300 pages. However, the remainder of content version 304 may include no content. Accordingly, content version 310 may be limited to consumption in conjunction with or with reference to a complete content version, such as content versions 304-308. For example, in accordance with aspects of the present disclosure, a user may be enabled to begin or switch to consumption of content version 310 only during playback corresponding to portions 312 or 314 of content version 310.

In other embodiments, content versions that include only portions of an overall content item may be modified such that they include the entirety of the content item. For example, content version 310 may be supplemented with information from one or more of content versions 304-308. Illustratively, those portions of *The Count of Monte Cristo* not included within portions 312 or 314 may be retrieved from the unabridged content version 304, and used to supplement portions 312 and 314. Accordingly, a complete representation of *The Count of Monte Cristo* may be achieved that contains all relevant information from the expanded content version 310.

Though, in FIG. 3A, each content version is shown with a corresponding beginning and ending point, such representation should be used to infer that all points within each content version necessarily correspond. For example, a position 30% through the duration of content version 304 may not correspond to a position 30% through the duration of content version 306. Illustratively, this discrepancy may be caused by editorial differences within two content versions. For example, the first 30% of content version 304 may include a large amount of descriptive material omitted from the content version 306, and as such, a position 30% through the duration of content version 304 may correspond to a position 10% through the duration of content version 306. Accordingly, the representation of FIG. 3A should not be assumed to show that similar positions within different content versions necessarily correspond. Rather, correspondence between content versions may instead be determined by synchronization information associated with the content versions. Generation of synchronization information is described in more detail above with respect to FIG. 1.

Figure 3B:
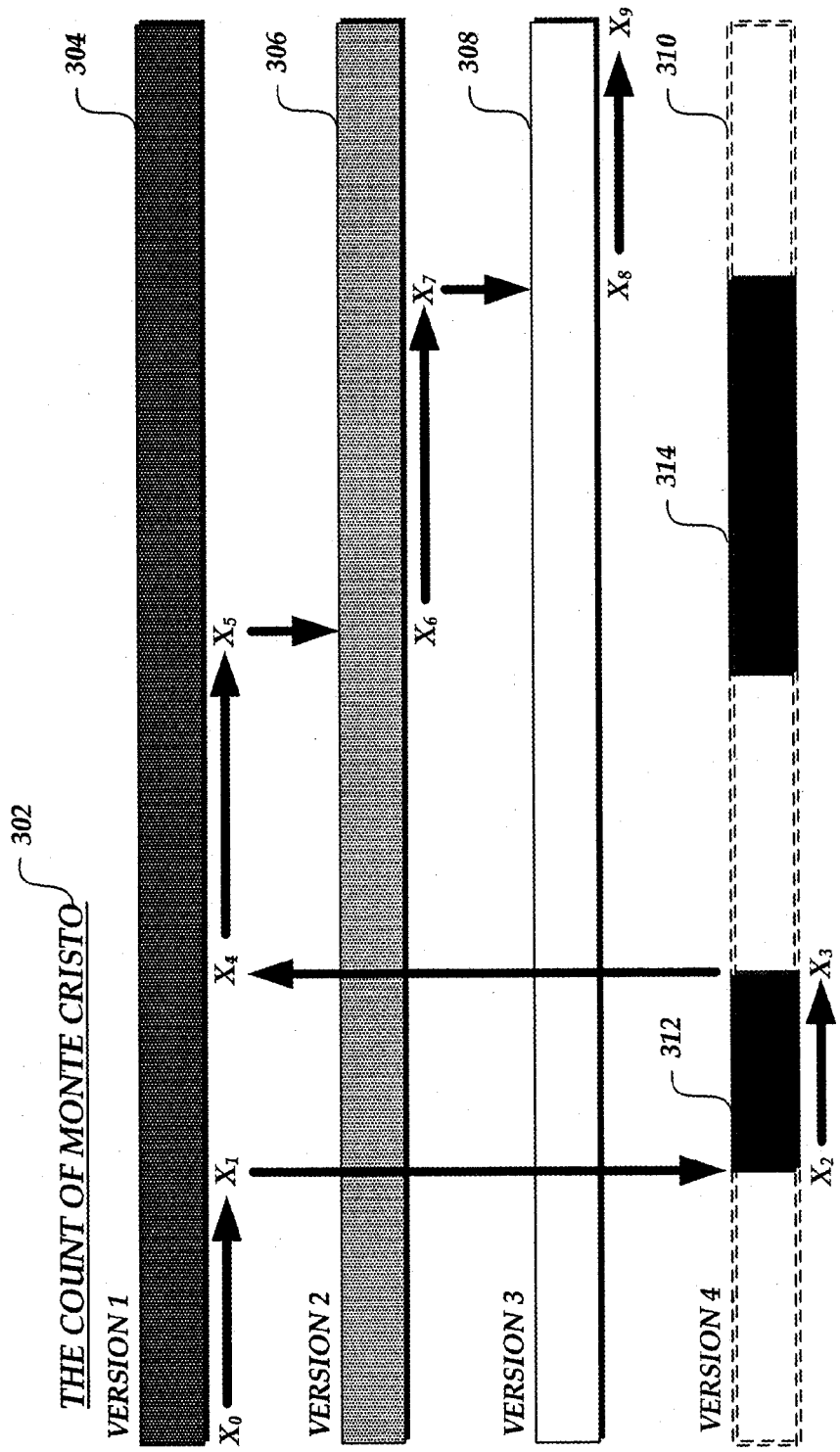
FIG. 3B is an illustrative graphical representation or visualization of a user's playback path of the multiple content versions of FIG. 3A.

Illustratively, FIG. 3B may represent one possible user playback path through multiple versions of a content item, such as *The Count of Monte Cristo* e-book. As described in FIG. 3A, content versions 304-310 may correspond to various versions of *The Count of Monte Cristo* e-book, such as an unabridged version, an abridged version, a summary version, and an expanded version, respectively. As shown in FIG. 3B, a user may begin consumption of the unabridged content version 304 at point $X_0$, and continue consuming the unabridged content version 304 until point $X_1$. At point $X_1$, the user may be presented with an option to switch to consumption content version 310, representing an extended portion of the e-book. In some embodiments, a user may select to switch to consumption of a different version via a graphical user interface, such as the user interface discussed with respect to FIG. 4A below. In other embodiments, a user may be presented with a notification that a different content version is available, and be presented with an option to consume that content version. Such notifications may be desirable where different content versions are not perpetually available. For example, content version 310 includes content only at content portions 312 and 314, and as such, may not be perpetually selectable during consumption of alternate versions. Accordingly, a user may benefit from a notification that an expanded portion (e.g., content portion 312 or 314) is available.

In the instance that a user does select to switch from unabridged content version 304 to expanded content version 310 (e.g., because the user would like more detail within the upcoming portion), the device of the user may present content version 310 at a point corresponding to a last consumed portion of content version 304. For example, a user consuming content version 304 at point $X_1$ may, after electing to switch to consuming content version 310, begin consuming content version 310 at point $X_2$. Points $X_1$ and $X_2$ may represent the same or similar points within the content item. For example, points $X_1$ and $X_2$ may represent the start of the same chapter, segment, scene, dialogue, etc., within *The Count of Monte Cristo* e-book. Accordingly, by switching from consumption of content version 304 at point $X_1$ to consumption of content version 310 at point $X_2$, a user's overall progress through the content item may be maintained. As described above with reference to FIG. 1, corresponding points within different content versions may be determined based at least in part on synchronization information associated with the content versions. Illustratively, such synchronization information may include mapping information mapping points within a first content version to points with a second content version.

Thereafter, the user may continue to consume content version 310 until electing to switch to an alternate content version. For example, the user may elect to revert to consumption of content version 304. In some instances, the user may elect to switch to a different content version of their own volition. In other instances, a user may be required to select an alternate content version for playback. For example, at point $X_3$, the content portion 312 of content version 310 may end. Because content version 310 does not contain any content corresponding to portion of *The Count of Monte Cristo* between content portions 312 and 314, the user may be required to select an alternate content version for consumption. In the illustration of FIG. 3B, the user may elect to revert to playback of content version 304 (e.g., an unabridged version). Accordingly, a user may be presented with content version 304 beginning at the point $X_4$. Similarly to the previous transition described above, point $X_3$ (at which the user ceased playback of content version 310) and point $X_4$ (at which the user begins playback of content version 304) may represent similar portions of the overall content item. For example, points $X_3$ and $X_4$ may correspond to similar chapters, scenes, sections, or segments in the content item, or may generally correspond to similar plot points, discussion of similar events, or similar points of progression within the overarching content. Accordingly, a user may transition between consuming content version 310 to consuming content version 304 without affecting the user's overall progression of the content item.

Thereafter, during playback of content version 304, a user may elect to transition to an alternative content version. For example, a user may find the unabridged content version 304 to be too lengthy, and desire to finish the content item (e.g., *The Count of Monte Cristo*) more quickly. Accordingly, the user may elect to switch to the abridged content version 306 at point $X_5$. The user may therefore be presented with the corresponding section of the abridged content version 306 from point $X_6$, corresponding to point $X_5$ within the unabridged content version 304. Similarly, during playback of content version 306, the user may elect to transition to a still more brief version of the content item, such as the summary content version 308. For example, the user may wish to know how the content item ends, but not wish to spend any more time than necessary completing the item. Accordingly, the user may elect to switch from the abridged content version 306 at point $X_7$. The user may therefore be presented with the corresponding section of the summary content version 308 from point $X_8$, corresponding to point $X_7$ within the abridged content version 306. Thereafter, the user may complete playback of the content item at point $X_9$, which may correspond to the end of the content item.

Figure 4A:
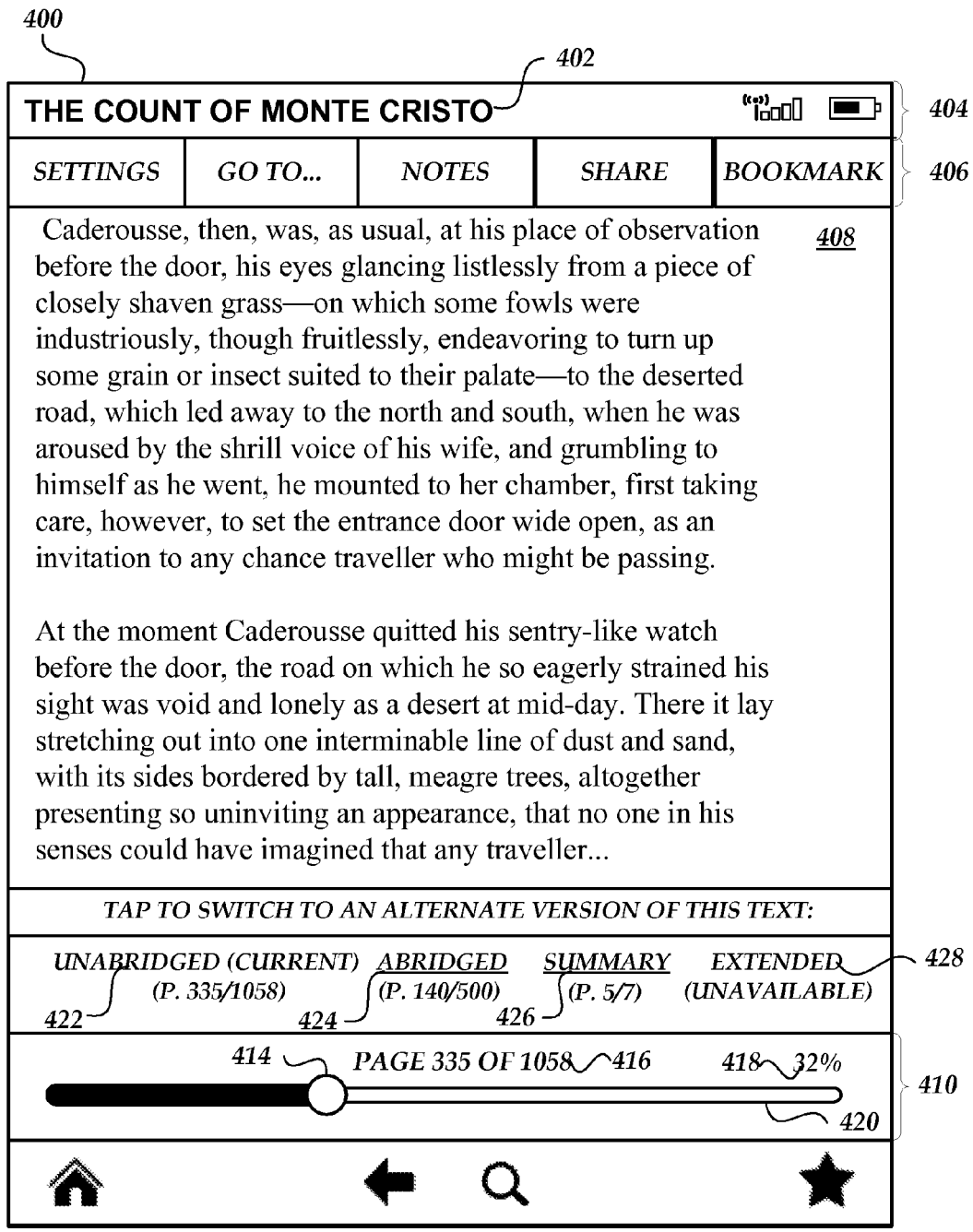
FIGS. 4A and 4B depict illustrative user interfaces that may be used to facilitate playback of multiple versions of a content item via the content version management server of FIG. 1.

Turning to FIG. 4A, one example of a user interface 400 enabling user selection of alternative content versions is shown. The illustrative user interface 400 may be generated, for example, on a computing device 104 of FIG. 1. The user interface 400 may include a number of display features for presenting information regarding the computing device 104, the content item displayed, or information regarding alternative versions of the content item. For example, display feature 404 reflects information regarding the status of the computing device 104, such as a battery level, a wireless network signal strength, and a title 402 of the currently displayed e-book content item (e.g., *The Count of Monte Cristo*). Display feature 406 reflects options for user interaction with the computing device 104, such as links to settings, options to go to a specific point in the displayed e-book, notes regarding the displayed e-book, options to share portions of the displayed e-book with other computing devices 104, and bookmarks of the displayed e-book. The user interface 402 further includes a display portion 408 for displaying text of the currently selected version of the e-book. In the illustrative interface 400, a first content version, such as content version 304 of FIGS. 3A and 3B, is displayed by display feature 408. In the illustrative interface 400, the first content version corresponds to an unabridged version of *The Count of Monte Cristo*. In addition, the display feature 408, includes a page indicator 416 indicating a current page of the displayed content version, as well as a consumption indicator 418 displaying the percentage of the content version consumed, and status bar 420 displaying a location of consumption in the content version and enabling rapid relocation of consumption (e.g., by interaction with input control 414 to select a new location on the status bar 420). As will be appreciated by one skilled in the art, the user interface 400 may include additional or alternative display features, such as interface panel 410, including icons selectable by a user of the computing device 104 (e.g., to view additional portions of the user interface 400).

In addition, the user interface 400 may include controls for facilitating selection of alternate content versions corresponding to the currently displayed content item 402. As displayed in FIG. 4A, the user interface 400 includes links 422-428, each corresponding to an alternate content version of the currently displayed content item 402. Illustratively, link 422 may correspond to the unabridged content version of *The Count of Monte Cristo*. Link 422 may currently be unselectable by a user, since the unabridged content version of *The Count of Monte Cristo* is displayed within the user interface 400. Links 424-428 may correspond to alternative content versions. For example, link 424 may correspond to an abridged content version (e.g., content version 306 of FIGS. 3A and 3B); link 426 may correspond to a summarized content version (e.g., content version 308 of FIGS. 3A and 3B); and link 428 may correspond to an expanded content version (e.g., content version 310 of FIGS. 3A and 3B). Further, each link 422-428 may include an indication of the corresponding position within the alternative content version. For example, link 424 may indicate that the current position within the unabridged content version, page 335 of 1058, corresponds to page 140 of 500 within the abridged content version. Similarly, link 426 may indicate that the current position within the unabridged content version, page 335 of 1058, corresponds to page 5 of 7 within the summarized content version. Such position indicators may assist a user in determining whether to switch to consumption of an alternative content version.

Upon user selection of a link 422-428, the user interface may be altered to display the corresponding alternative content version, as will be described below with respect to FIG. 4B. In some instances, alternative content versions may be unavailable for user selection. For example, as discussed above with respect to FIGS. 3A and 3B, some content versions may only include portions of an overall content item (e.g., content version 310 of FIGS. 3A and 3B). Accordingly, an incomplete content version may not be selectable when consuming portions of a content item that do not exist within the incomplete content version.

Figure 4B:
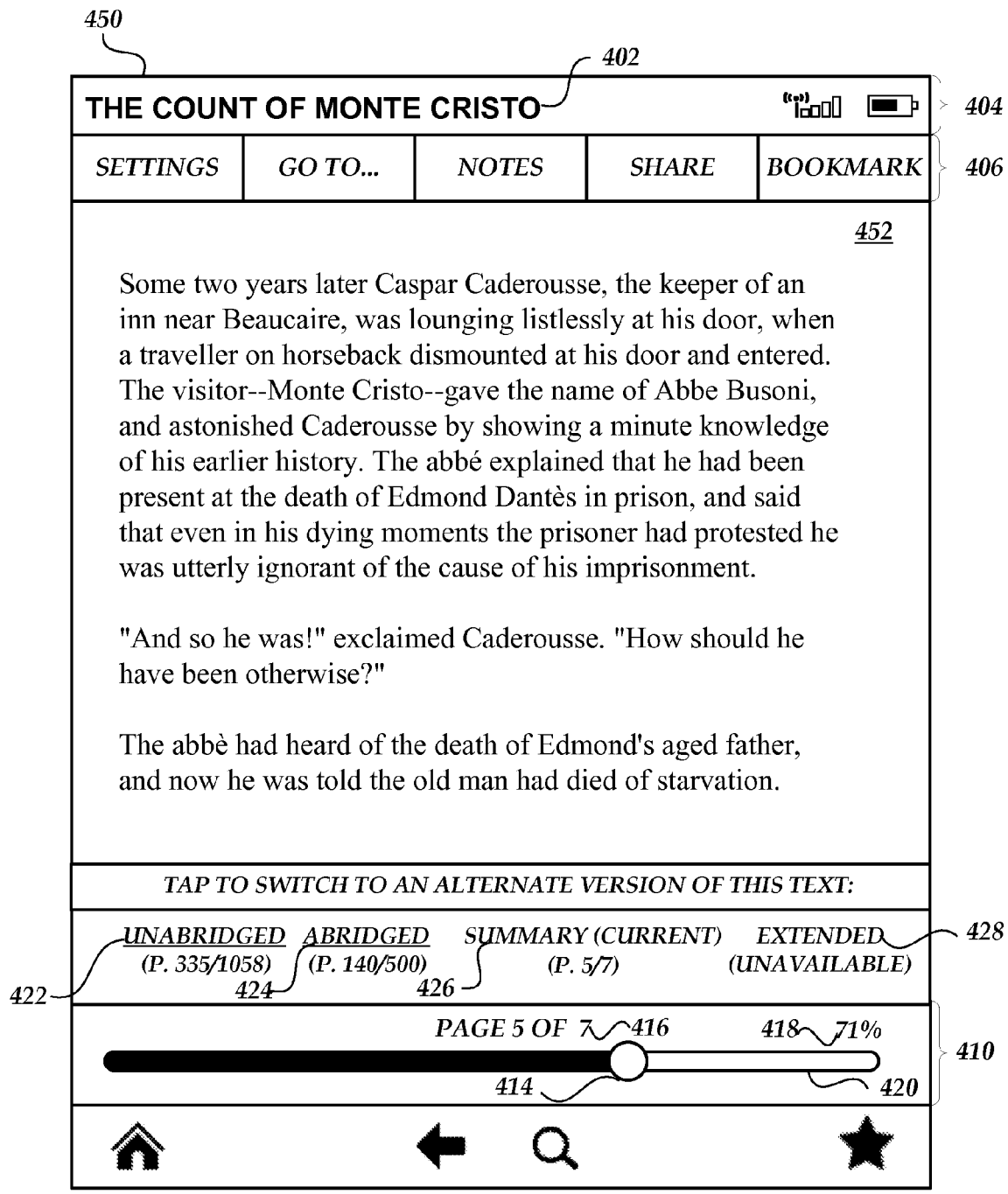

With reference now to FIG. 4B, an illustrative user interface 450 for playback of an alternative content version is displayed. The illustrative user interface 450 may be generated, for example, by a computing device 104 of FIG. 1.

Illustratively, user interface 450 may be displayed by a computing device 104 in response to user selection of a link 426 of FIG. 4A. Accordingly, the user interface 450 may include a display portion 452 reflecting a summarized version of the content item *The Adventures of Monte Cristo*. Because many of the display features of FIG. 4B are described above with respect to FIG. 4A, they will not be described in more detail herein.

Display portions 408 of FIG. 4A and 452 of FIG. 4B may reflect corresponding portions of the content item within each content version. For example, display portion 408 of FIG. 4A describes a specific character "Caderousse" and his reaction to the arrival of "a traveller." Similarly, display portion 452 of FIG. 4B describes the character "Caderousse" and the arrival of "the traveller," but does so in significantly less detail. Because the portion of text displayed in FIG. 4B corresponds to the portion of text displayed in FIG. 4A, a user switching between the two portions of text would maintain an overall progression of the content item, *The Count of Monte Cristo*, without being required to locate a currently consumed position within the content item. Illustratively, corresponding portions may be determined based at least in part on synchronization information associated with each content version. As described above with respect to FIG. 1, synchronization information may include mappings from positions within a first content version to positions within a second content version. In the current example of FIGS. 4A and 4B, synchronization information may map page 335 of the unabridged version of *The Count of Monte Cristo* to page 5 of the summarized version of the same title.

Similarly to as described above with respect to FIG. 4A, the user interface 450 may include a number of links 422-428 selectable to display alternative content versions of the content item. For example, user selection of link 422 may return the user to the user interface 400 of FIG. 4A, while selection of link 424 may generate a user interface including a corresponding portion of an abridged content version. As described above, in some instances, one or more of the links 422-428 may not be selectable by a user. For example, because the summarized version of the current content item is displayed in the user interface 450, the link 426 to the summarized content version may not be selectable. In addition, links may not be selectable where the currently consumed position of a content item is not included within a content version. For example, link 428 may not be selectable if the related content version does not include a portion corresponding to the currently displayed location within the content item.

Figure 5:
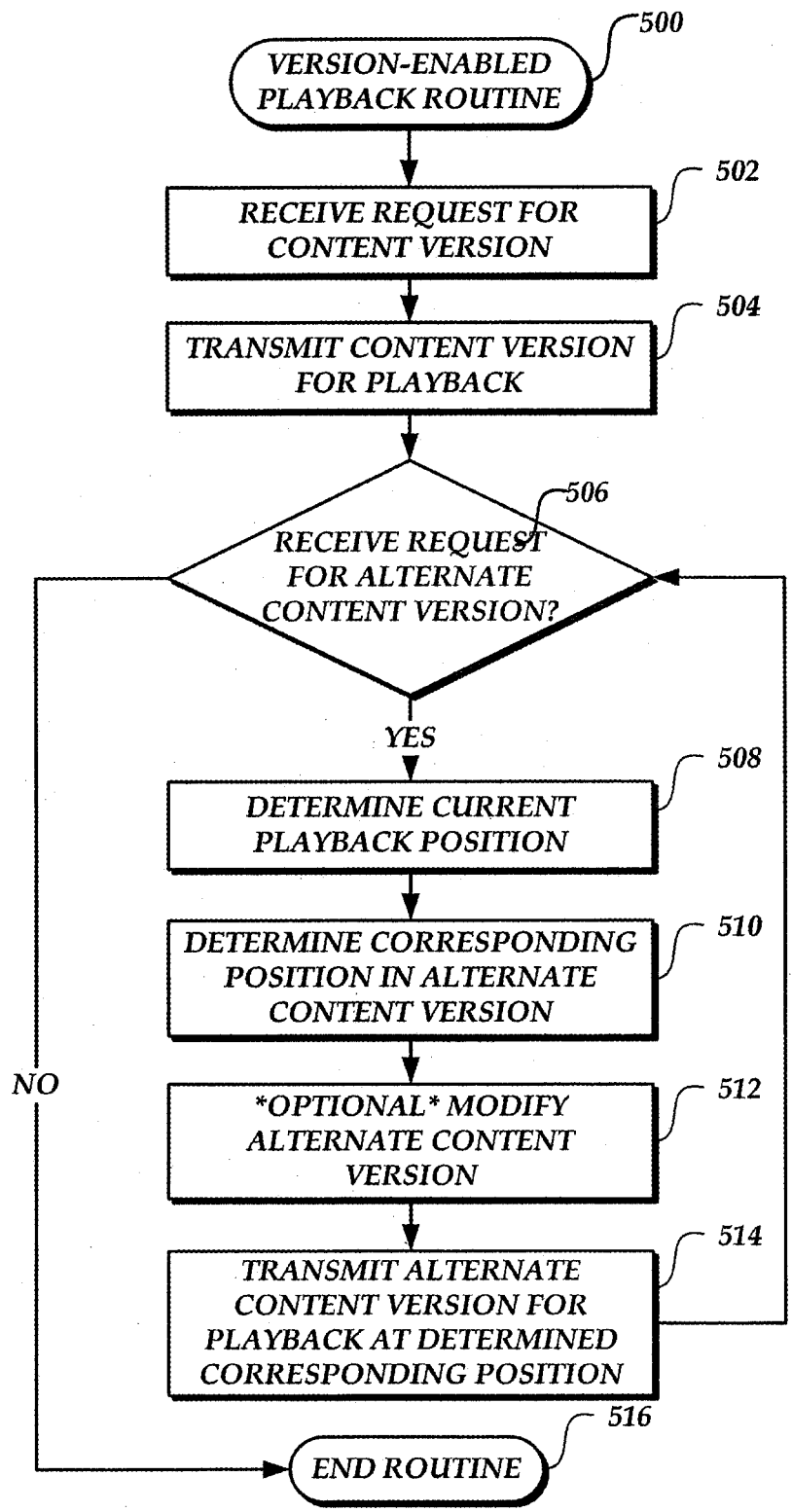
FIG. 5 is a flow diagram depicting an illustrative routine for enabling playback of multiple versions of a content item, which may be implemented by the content version management server of FIG. 1.

With reference to FIG. 5, one illustrative routine 500 for enabling playback of a content item including multiple content versions will be described. The illustrative routine 500 may be implemented or executed, for example, by the content version management system 102 of FIG. 1. The routine 500 may begin at block 502, where a request for a content version, such as the unabridged version of *The Count of Monte Cristo* is received (e.g., from a user computing device 104 of FIG. 1). In response to such a request, the corresponding content version may be transmitted at block 504 to the user computing device 104 for playback (e.g., display of an e-book, audio output of an audio book, etc.).

Thereafter, at block 506, a request may be received for an alternate content version corresponding to the currently consumed content item. For example, where the content version described above corresponds to as the unabridged version of *The Count of Monte Cristo*, a request may be received to begin playback of an abridged version, a summarized version, or an expanded version of the same title. In instances where a request is not received for an alternate content version, the routine 500 may end at block 516. However, for the purposes of the present disclosure, it will be assumed that at least one request for an alternative content version is received at block 506.

Thereafter, at block 508, the content version management system 102 may determine a current playback position within the currently consumed content version. For example, where there currently consumed version corresponds to the unabridged version of *The Count of Monte Cristo* (e.g., content version 304 of FIGS. 3A and 3B), a current playback position may correspond to "page 335 of 1058." Further examples of a current playback position may include a current chapter, paragraph, line, sentence, word, timestamp, position locator, or any other indication of a user's current position within a content version.

At block 510, the content version management system 102 may utilize the determined current playback position to determine a corresponding location within the requested alternate content version. Illustratively, such a determination may utilize synchronization information previously generated by the content version identification module 116 of FIG. 1. As discussed above with respect to FIG. 1, synchronization information may include a mapping of locations or positions within two content versions. Accordingly, by utilizing a determined current playback position within a first content version as well as synchronization information mapping positions in the first content version to positions in a second content version, a corresponding position in the second content version may be determined. For example, the previously determined current playback position may correspond to page 355 of the unabridged version of *The Count of Monte Cristo* (as illustratively shown in FIG. 4A). Further, the requested alternate version may correspond to a summarized version of *The Count of Monte Cristo*. Accordingly, based on the determined current playback position, the content version management system 102 may utilize synchronization information mapping the unabridged version and summarized version to determine that page 5 of the summarized version should be displayed, resulting in the illustrative user interface shown in FIG. 4B. As discussed above with respect to FIGS. 4A and 4B, the respectively displayed portions of *The Count of Monte Cristo* generally correspond to the same position within the overall plot of the text (e.g., the introduction of "Caderousse" and "the traveller"). Accordingly, a user requesting to switch from consuming the unabridged version of *The Count of Monte Cristo* would not be required to relocate their position within the content item in the summarized version, but would instead be enabled to immediately consume the summarized version, thereby enhancing the user experience.

At block 512, optionally, the requested alternate content version may be modified (e.g., to further enhance the user experience). For example, as described above, in some instances, a user switching from a less inclusive version of a content item to a more inclusive version (e.g., from an abridged version to an unabridged version, from an unabridged version to an expanded version, etc.) may be presented with aspects of the more inclusive version that were omitted from the less inclusive version. For example, an abridged content version may exclude minor characters or sub-plots in order to reduce the length or complexity of the abridged content version. However, if a user consumes a portion of the abridged content version, and then switches to consumption of the unabridged content version, these previously omitted characters or sub-plots may be referenced. Such references to previously omitted aspects may be confusing for the reader. Accordingly, in some embodiments the content version management module 118 (e.g., in combination with the content version customization module 122) may modify a content version in order to remove such discrepancies. For example, the content version customization module 122 may be configured to modify an unabridged content version in order to remove extraneous references to aspects previously omitted from a previously consumed version.

In some embodiments, certain aspects of a content item (e.g., characters, sub-plots, locations, etc.) may be associated with a relevance point indicating a position within the content item at which the aspect is either no longer relevant, or only of minor relevance. Illustratively, given an example where a minor character's major contribution to a content item is early within the content item, but where the minor character is referenced (though not directly involved) later within the content item, the character's relevance point may correspond to the end of their major contribution to the content item. Accordingly, when switching between a less inclusive content version and a more inclusive content version, a determination may be made as to whether the relevance point of a given aspect has passed. If such a point has passed, the more inclusive content version may be modified (e.g., by the content version customization module 122) to remove further reference to the aspect. However, if such a point has not passed, the aspect may be retained.

In some embodiments, references to aspects such as characters, sub-plots, locations, etc., or relevance points for these aspect, may be included within a content item manually (e.g., by an author, editor, publisher, content provider, or end users). One skilled in the art will appreciate that multiple voting or crowd-sourcing techniques may be utilized to aggregate or filter input from a variety of sources. In other embodiments, references to aspects, or relevance points for those aspects, may be determine automatically or partially automatically. For example, a content item may be analyzed for the frequency of inclusion of keywords (e.g., non-dictionary language, etc.). Where a keyword, such as a character name, occurs above a threshold frequency within a given portion of a content item, the keyword may be deemed to be of continued relevance during that portion. Where the same keyword's occurrence decreases beyond the threshold frequency at a later point within the content item, the keyword may be determined to have passed its relevance point. Accordingly, references to the keyword after the relevance point may be removed (e.g., by removal of the keyword, sentences including the keyword, etc.). In some embodiments, references may be automatically removed. These automatic modifications may then further be reviewed by manually in order to ensure the readability of modifications. In other embodiments, references may be purely manually removed. Though these modifications are discussed herein as occurring within the routine 500, in some instances, relevance points of aspects, as well as appropriate modifications of content versions related to those aspects, may be determined in advance of the routine 500. Accordingly, block 512 may include implementation of such previously determined modifications, or real-time modification based on previously determined relevance points.

Thereafter, at block 514, the requested alternate content version may be transmitted to the user computing device 104 for playback at the determined corresponding position. In some embodiments, such transmission may include transmitting only a portion of the alternate content version (e.g., beginning at the determined corresponding position). In other embodiments, such transmission may include transmitting the entirety of the alternate content version. In still more embodiments, a user computing device 104 may already include the requested alternate content version, and as such transmission of the alternate content version may not be necessary. In these embodiments, block 514 may include transmission of the determined corresponding position. Still further, in some embodiments, block 514 may include transmission of synchronization information corresponding to the previously consumed content version and the requested alternate content version.

Thereafter, the routine 500 may continue at block 506, where alternate content versions may be requested by the user computing device 104. For example, a user may reverse the above discussed request, and request to switch back to the originally consumed content version. Accordingly the routine may repeat blocks 508-514 with respect to the newly requested content version. Alternatively, where further requests for alternate content versions are not received, the routine may end at block 516.

Figure 6:
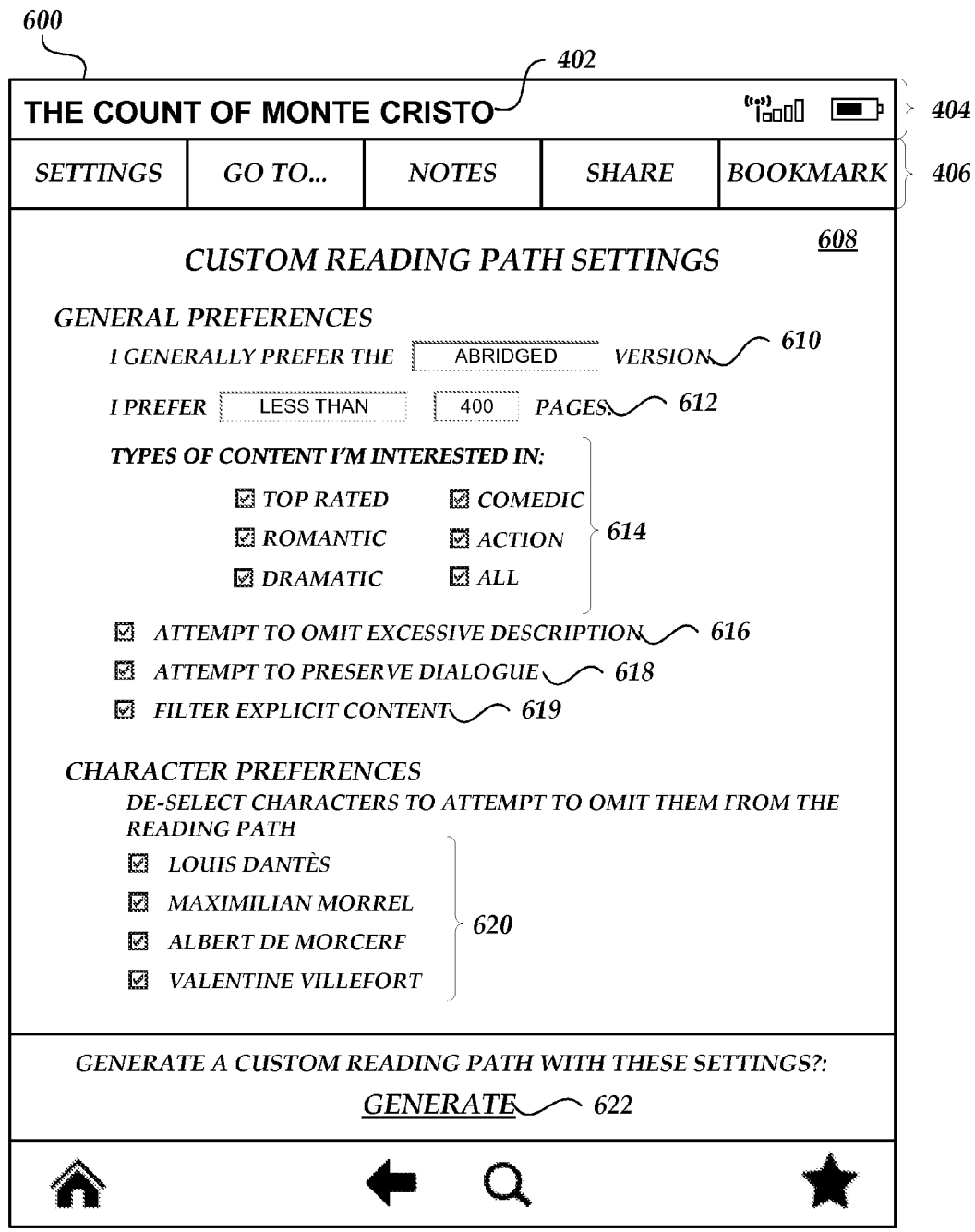
FIG. 6 depicts an illustrative user interfaces that may be used to select preferences for generation by a content version management server of FIG. 1 of a customized playback path corresponding to multiple versions of a content item.

With reference now to FIG. 6, an illustrative user interface 600 for user selection of preferences regarding a customized playback path is displayed. The illustrative user interface 600 may be generated, for example, by a computing device 104 of FIG. 1. Because display features 402-406 are discussed in detail above with respect to FIG. 4A, these display features 402-406 and will not be re-described with respect to FIG. 6.

As described above, in some embodiments, it may be beneficial to enable users to create customized playback paths through multiple version of a content item, in addition to or exclusive of enabling a user to switch between content versions. Generally, a playback path may include multiple portions of content versions that, when read in conjunction, represent major aspects of the content item, such as major characters, overall plot, storyline, etc. For example, the progression described above with respect to FIG. 3B may represent one possible playback path through the multiple versions of *The Count of Monte Cristo*. Accordingly, a customized playback path may represent one potential playback path preselected based on a user's preferences, such that a user is not required to elect to switch between content versions. Illustratively, a customized playback path for *The Count of Monte Cristo* may include playback of the unabridged version between points $X_0$ and $X_1$ of FIG. 3B, playback of the expanded version between points $X_2$ and $X_3$, etc. For example, by utilizing a customized playback path, a user may be enabled to consume in detail only those portions of a content item that they would prefer, while consuming other portions in abridged or summarized form. In addition, customized playback paths may enable creation of a version of a content item that conforms more closely to a user's preferences than any other available content version. Illustratively, a user may desire a content version including no more than 1000 pages of material. In instances where an unabridged content is represented by 1058 pages, and an abridged content is represented by 500 pages, the user's preferences may generally necessitate presentation of the abridged content. However, the abridged version may be somewhat less inclusive than the user would otherwise desire (e.g., by excluding over half the content of the unabridged version, when the user preferences only necessitate exclusion of 58 pages of the unabridged version). Accordingly, by creating a customized playback path including playback of the majority of the unabridged version as well as small portions of the abridged version, a customized content version may be created including no more than 1000 pages, but retaining more detail than the abridged content version.

Accordingly, one example of a user interface for receiving user preferences for use in generation of such a customized playback path is displayed in FIG. 6. As shown in FIG. 6, the display portion 608 includes multiple selectable inputs 610-

620, each corresponding to an illustrative preference for creation of a customized playback path. For example, selectable input 610 may enable a user to select a preferred or default content version. Illustratively, a user may be enabled to select one of any available content versions for a currently displayed content item 402. A selected content version may be used as the "base" content version when creating a customized playback path. For example, the customized playback path may tend to include portions of the preferred content version, unless those portions would not conform to other stated preferences. As a further example, selectable input 612 may enable selection of page preferences for a customized playback path. Illustratively, a user may be enabled to select a maximum page limit, a minimum page limit, a preferred page count, or any combination thereof. In some embodiments, such preferences may be strictly enforced (e.g., no customized playback path may be created that does not conform to the preferences). Further, though illustrative preferences are described herein with respect to textual content, additional or alternative preferences may be included for other content types. For example, preferences for a customized playback path corresponding to an audio content may include a maximum, minimum, or preferred duration, or any combination thereof.

Still further, the user interface 600 may include selectable inputs enabling a user to select types of content to attempt to include or exclude from a customized playback path. For example, a user may be enabled to select input 616 to attempt to omit excessive description within the customized playback path. Similarly, a user may be enabled to select input 618 to attempt to preserve dialogue within the customized playback path. As yet another example, a user may be enabled to select input 619 to request filtering or removal of unsuitable or explicit content (e.g., content including excessive violence, adult language or themes, etc.).

In some embodiments, types of content, such as excessive dialogue, description, or explicit content, may be marked or otherwise indicated within a content version manually (e.g., by users, authors, editors, publishers, content providers, etc.). In other embodiments, types of content may be automatically or semi-automatically determined (e.g., by the content version management system 102 of FIG. 1). For example, dialogue may be determined by use of punctuation. Similarly, excessive description may be characterized by large use of adjectives and lack of dialogue. As a further example, with respect to explicit or unsuitable content, content may be searched for keywords in order to identify passages or portions of content that may be considered explicit or otherwise unsuitable. Accordingly, portions of content versions including dialogue or excessive description may be marked for later use in creation of a customized playback path.

In some embodiments, a customized playback path may further enable a user to select one or more aspects of a content item to exclude. Illustratively, minor aspects such as subplots, minor characters, and minor locations may be omitted from a content item while still retaining the major aspects of the content item. Accordingly, in some embodiments, a user interface may include selectable inputs corresponding to one or more such minor aspects. For example, the user interface 600 may include a collection of selectable inputs 620 corresponding to minor characters that may be removed (or attempted to be removed) from a customized playback path. In some embodiments, user de-selection of a given character may result in a customized playback path including at least a portion of an abridged content version (e.g., corresponding to a portion in the unabridged content version during which the de-selected character is discussed). In other embodiments, user de-selection of a given character may result in modification of a content version in order to attempt to remove the de-selected character. For example, the content version customization module 122 of FIG. 1 may be used to remove references to the de-selected character for a content version. Removal of references to a minor aspect of a content version (such as a minor character) is discussed in more detail with respect to FIG. 5, above.

Though illustrative examples of preferences for creation of a customized reading path are described herein, additional or alternative preferences may be included without departing from the present disclosure. Moreover, in some embodiments, preferences discussed above may not be required for creation of a customized playback path, and may therefore be excluded.

After selection of all relevant preferences, a user may select input control 622 in order to generate a customized playback path based on those preferences. One example of a routine for the generation of a customized playback path will be described below with respect to FIG. 7. After generation of a customized playback path, the relevant portion of each of content version included within the customized playback path may be displayed (e.g., on a user computing device 104) via a user interface. For example, the illustrative user interfaces 400 and 450 of FIGS. 4A and 4B may be modified to reflect a "customized" content version (e.g., corresponding to those portions of each content version included within the customized playback path). Illustratively, the text corresponding to the customized playback path may be displayed within the display feature 408, while a link to the customized playback path may be included as an alternate version for selection.

Though described above with respect to a customized playback path including portions of multiple content versions, in some embodiments, a new content version may be created corresponding to the customized playback path. Illustratively, rather than automatically switching between content versions according to the customized playback path, the content version management system 102 may create a new content version including only portions of each previous content version corresponding to the customized playback path. Accordingly, a user computing device 104 may be configured to simply view the newly created, customized content version.

Figure 7:
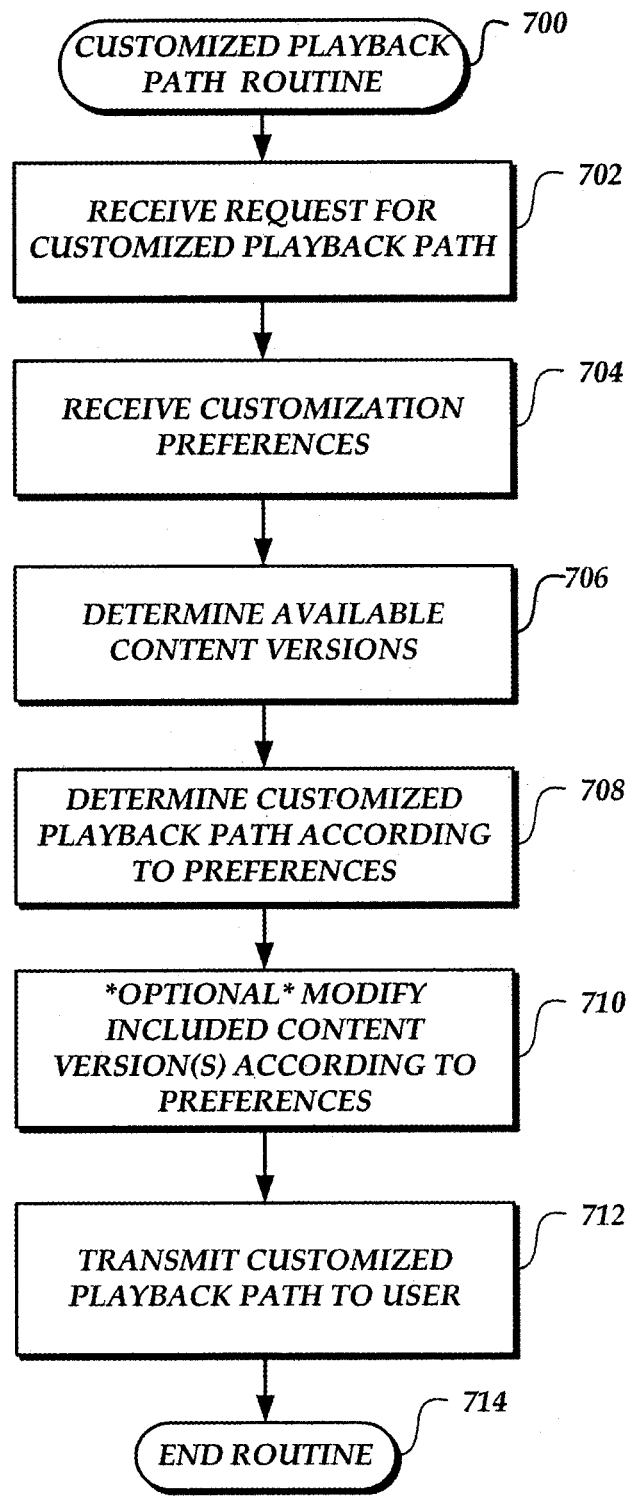
FIG. 7 is a flow diagram depicting an illustrative routine for generation of a customized playback path by a content version management server of FIG. 1.

With reference to FIG. 7, one illustrative routine 700 for creation and provision of a customized playback path (or a customized content version based thereon) will be described. The illustrative routine 700 may be implemented or executed, for example, by the content version management system 102 of FIG. 1. The routine 700 may begin at block 702, where a request for a customized playback path corresponding to a content item, such as *The Count of Monte Cristo* is received (e.g., from a user computing device 104 of FIG. 1). Such a request may be received, for example, based on user selection of input control 622 of FIG. 6. In addition to reception of the above-discussed request, a set of customization preferences (such as those input via user interface 600 of FIG. 6) may be received at block 704.

Thereafter, the content version management system 102 may determine a set of available content versions corresponding to the content item. Illustratively, the content version management system 102 may determine that, for *The Count of Monte Cristo*, an unabridged version, an abridged version, a summarized version, and an expanded version are available. Accordingly, a customized playback path may include any combination of one or more of the available content versions. In some embodiments, a customized playback path may contain only a single content version. For example, a user's preferences may indicate that a single content version largely conforms to their desires. In these embodiments, the selected single content version may nevertheless be modified (e.g., by the content version customization module 122) in order to further conform to the user's preferences, as will be described below.

At block 708, the specific content version or combination of portions of content versions that conform to the user's preferences may be determined. In some embodiments, the determination of specific content version or combination of portions of content versions may be based at least in part on a desired number or frequency of transitions between content versions. For example, multiple or frequent transitions between content versions may be more likely to result in an undesirable user experience (e.g., because of the increased likelihood of disjunction). Accordingly, a single content version that conforms to a user's preferences may be more desirable than a combination of two content versions that conform to a user's preferences, which may be more desirable than a combination of three content versions conform to a user's preferences, etc. Similarly, a combination that includes the majority of a first content version and only a small portion of a second content version may be more desirable than a combination that contains half of each of two content versions.

As described above, in some embodiments, users may be enabled to select a type of content for preferential inclusion in a customized playback path. For example, a user may desire playback of comedic portions, while not desiring playback of romantic portions. Accordingly, determination of a content version (or combination of content versions) may include attempting to include preferred portion types in more detail (e.g., from a more inclusive version), while including non-preferred portion types in less detail or excluding these portions (e.g., including a portion from less inclusive version, or a portion from a version that omits the portion). Illustratively, a type may be assigned to a portion by automatic, semi-automatic, or manual means. For example, automatic or semi-automatic analysis may include content analysis, such as keyword searches, for adjectives likely to indicate certain portion types. In addition, analysis (such as semi-automatic analysis or manual analysis) may include identification of portion types by end users, authors, editors, publishers, content providers, or other entities. In one embodiment, end users (e.g., of the content version management system 102) may be enabled to "tag" portions as conforming to a portion type.

In some embodiments, determination of a customized playback path may include generation of a number of potential customized playback paths. For example, in some embodiments, the content version management system 102 may be configured to determine all or any subset of possible customized playback paths through available content versions. Thereafter, the content version management system 102 may assign a score to each potential customized playback path based on the user's preferences. For example, a positive score may be assigned to a playback path that conforms to a desired length or duration. Similarly, a positive score may be assigned for each content portion conforming to a desired portion type. Illustratively, for each comedic content portion within a potential customized playback path, the score of the customized playback path may be increased, while for each romantic content portion within a potential customized playback path, the score of the customized playback path may be decreased. By comparing the scores of each determined potential playback path, a specific customized playback path that conforms to a user's preferences may be determined.

At block 710, optionally, the content versions (or portions thereof) that are included within the determined customized playback path may be modified (e.g., by the content version customization module 122 of FIG. 1) in order to further conform to the user's preferences. For example, if the selected customized playback path exceeds a user's desired maximum length or duration, the content version customization module 122 may be configured to attempt to reduce the length or duration of at least one portion of a content version within the customized playback path. Illustratively, reduction of length or duration may be achieved by removing minor aspects of the relevant portion, such as minor characters, sub-plots, locations, etc. As a further example, a user may desire to remove aspects of content, such as specific characters, locations, excessive description, dialogue, or types of content (e.g., explicit or unsuitable content). Accordingly, at block 710, content may be analyzed in order to identify and remove undesired aspects, where possible. As described above, in some embodiments, these content aspects may be manually, semi-manually, or automatically identified within a content item. As such, removal of undesirable aspects may include identification of markers corresponding to an undesirable aspect, and removal of the marked portion of the content item. Illustratively, individual words, sentences, paragraphs, passages, etc., that are marked as explicit or unsuitable may be removed from the content item. In some embodiments, where a content item does not include markers for undesirable aspects, the routine 700 may include automatically analyzing the content item in order to locate undesirable aspects, as described above. Though illustrative examples are given herein with regard to duration and to explicit content, modification by the content version customization module 122 may be based on any user preference, such as those preferences described above with respect to FIG. 6.

In addition, though modification of portions of content versions is described herein as subsequent to determination of a customized playback path, in some embodiments, modification may occur prior to or simultaneously to determination of a customized playback path. For example, as described above, in some embodiments, multiple potential customized playback paths may be determined and scored according to their conformance with a user's preference. In some such embodiments, each potential customized playback path may be modified prior to such scoring.

Thereafter, at block 712, the determined customized playback path may be transmitted to the user. In some embodiments, such transmission may further include transmission of portions of content versions included in the customized playback path. In other embodiments, a user computing device 104 may already include or have access to the relevant content versions, and as such, transmission may include information identifying the portions of content versions included in the customized playback path.

Further, as described above, though a customized playback path including portions of multiple content versions is described herein, in some embodiments, a customized content version may be created based on a customized playback path, and transmitted to the user in addition to or as an alternative to the customized playback path itself. For example, a customized playback path may include a reference to portions of multiple content versions that, when consumed in conjunction, represent the entirety of the content item. Accordingly, each of the portions of the multiple content versions may be combined (e.g., by the content version management system 102) in order to create a customized content version. Thereafter, the customized content version may be transmitted to a user computing device 104.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for managing multiple versions of a content item, the computer-implemented method comprising:
    under control of one or more computing devices configured with specific executable instructions,
        obtaining synchronization information corresponding to a content item, wherein:
            the synchronization information associates at least a first position within a first version of the content item to at least a second position within an abridged version of the content item;
            the first version of the content item contains at least a portion of content omitted from the abridged version of the content item,
            the first position within the first version of the content item is within the portion of content omitted from the abridged version of the content item,
            the first version of the content item corresponds to a first complete version of the content item, and
            the abridged version of the content item corresponds to a second complete version of the content item;
        receiving a request from a user computing device for a custom version of the content item corresponding to a custom complete version of the content item, wherein receiving the request comprises receiving user preferences for determining portions of each of the first version and the abridged version for inclusion in the custom version of the content item;
        generating the custom version of the content item based at least in part on combining one or more portions of the first version with one or more portions of the abridged version, wherein generating the custom version comprises selecting the one or more portions of the first version and the one or more portions of the abridged version according to the synchronization information and the user preferences; and
        transmitting the custom version of the content item to the user computing device for playback.

2. The computer-implemented method of claim 1, wherein obtaining the first version of the content item comprises obtaining at least one of an e-book, an audio book, a video, a movie, or a periodical.

3. The computer-implemented method of claim 1, wherein obtaining the first version of the content item comprises obtaining at least one of an original version, a standard version, an unabridged version, an abridged version, or an expanded version.

4. The computer-implemented method of claim 1, wherein receiving the request further comprises receiving user preferences for determining portions of a third version of the content item for inclusion in the custom version, wherein the third version of the content item corresponds to a third complete version of the content item.

5. The computer-implemented method of claim 4, wherein generating the custom version is based at least in part on combining the one or more portions of the first version, the one or more portions of the abridged version, and one or more portions of the third version.

6. The computer-implemented method of claim 1, wherein generating the custom content version of the content item comprises:
   identifying a first portion of the first version of the content item;
   identifying, based at least in part on the synchronization information, a second portion of the abridged version of the content item;
   utilizing the user preferences to select one of the first portion and the second portion as a preferred portion; and
   adding the preferred portion to the custom version of the content item.

7. The computer-implemented method of claim 6, wherein identifying the first portion of the first version of the content item comprises:
   identifying a first position of a plurality of positions within the first version of the content item;
   identifying a second position of the plurality of positions within the first version of the content item; and
   identifying content of the first version between the first position and the second position as the first portion of the first version of the content item.

8. The computer-implemented method of claim 7, wherein identifying the second portion of the abridged version of the content item comprises:
   determining that the synchronization information associates the first position in the first version with a third position in the abridged version;
   determining that the synchronization information associates the second position in the first version with a fourth position in the abridged version; and
   identifying content of the abridged version between the third position and the fourth position as the second portion of the abridged version of the content item.

9. The computer-implemented method of claim 7, wherein the first position and the second position are consecutive within the plurality of positions within the first version of the content item.

10. A system for managing multiple versions of a content item, the system comprising:
    an electronic data store configured to store content information; and
    a computing device in communication with the electronic data store, the computing device configured to:
        obtain synchronization information corresponding to a content item, wherein the synchronization information associates at least a first position within a first version of the content item to at least a second position within an abridged version of the content item, wherein the first version of the content item corresponds to a first complete version of the content item, wherein the abridged version of the content item corresponds to a second complete version of the content item, wherein the first version of the content item contains at least a portion of content omitted from the abridged version of the content item, and wherein the first position within the first version of the content item is within the portion of content omitted from the abridged version of the content item;
        in response to a request from a user computing device for a custom version of the content item,
            determine the custom version of the content item based at least in part on combining one or more portions of the first version with one or more portions of the abridged version, the one or more portions of the first version and the one or more portions of the abridged version selected according to the synchronization information and the request, wherein the request comprises a set of preferences used during selection of the one or more portions of the first version and the one or more portions of the abridged version; and
        transmit information corresponding to the custom version of the content item to the user computing device for playback.

11. The system of claim 10, wherein the set of preferences comprises at least one of a maximum length or duration of the custom version of the content item, a type of material for inclusion or exclusion in the custom version of the content item, a preference for at least one of the first version or the abridged version, a preference for descriptive content, or a preference for dialogue.

12. The system of claim 10, wherein the first version and the abridged version differ in at least one of level of description, amount of dialogue, inclusion of one or more characters, inclusion of one or more locations, or inclusion of one or more sub-plots.

13. The system of claim 10, wherein the synchronization information further associates at least a portion of the abridged version of the content item to at least a portion of a third version of the content item.

14. The system of claim 13, wherein the computing device is configured to determine the custom version of the content item based at least in part on combining the one or more portions of the first version, the one or more portions of the abridged version, and one or more portions of the third version.

15. The system of claim 10, wherein the computing device is further configured to modify the custom version of the content item based at least in part on the request.

16. The system of claim 15, wherein the computing device is configured to modify the custom version of the content item in order to remove at least one of a character, a location, explicit content, or a sub-plot within the custom version of the content item.

17. The system of claim 15, wherein the information corresponding to the custom version of the content item comprises a custom playback path, wherein the custom playback path specifies portions of each of the first version and the abridged version for playback on the user computing device.

18. A non-transitory computer-readable storage medium having computer-executable modules for managing multiple versions of a content item, the computer-executable modules comprising:
    a content version management module configured to:
    obtain synchronization information corresponding to a content item, wherein the synchronization information associates at least a first position within a first version of the content item to at least a second position within an abridged version of the content item, wherein the first version of the content item corresponds to a first complete version of the content item, wherein the abridged version of the content item corresponds to a second complete version of the content item, wherein the first version of the content item contains at least a portion of content omitted from the abridged version of the content item, and wherein the first position within the first version of the content item is within the portion of content omitted from the abridged version of the content item;

in response to a request from a user computing device for a custom version of the content item, determine the custom version of the content item based at least in part on combining one or more portions of the first version with one or more portions of the abridged version, the one or more portions of the first version and the one or more portions of the abridged version selected according to the synchronization information and the request, wherein the request is associated with a set of preferences used during selection of the one or more portions of the first version and the one or more portions of the abridged version; and transmit information corresponding to the custom version of the content item to the user computing device for playback.

19. The non-transitory computer-readable storage medium of claim 18, wherein the first and abridged versions differ in at least one of level of description, amount of dialogue, inclusion of one or more characters, inclusion of one or more locations, or inclusion of one or more sub-plots.

20. The non-transitory computer-readable storage medium of claim 18, wherein the set of preferences comprises at least one of a maximum length or duration of the custom version of the content item, a type of material for inclusion or exclusion in the custom version of the content item, a preference for at least one of the first version or the abridged version, a preference for descriptive content, or a preference for dialogue.

21. The non-transitory computer-readable storage medium of claim 18, wherein the synchronization information further associates at least a portion of the abridged version of the content item to at least a portion of a third version of the content item.

22. The non-transitory computer-readable storage medium of claim 21, wherein the content version management module is further configured to determine the custom version of the content item based at least in part on combining the one or more portions of the first version, the one or more portions of the abridged version, and one or more portions of the third version.

23. The non-transitory computer-readable storage medium of claim 18, wherein the content version management module is further configured to modify the custom version of the content item based at least in part on the request.

24. The non-transitory computer-readable storage medium of claim 23, wherein the content version management module is configured to modify the custom version of the content item to remove at least one of a character, a location, explicit content, or a sub-plot within the custom version.

25. A computer-implemented method for managing multiple versions of a content item, the computer-implemented method comprising:

under control of one or more computing devices configured with specific executable instructions, obtaining synchronization information corresponding to a content item, wherein the synchronization information associates at least a first position within a first version of the content item to at least a second position within an abridged version of the content item, wherein the first version of the content item corresponds to a first complete version of the content item, wherein the abridged version of the content item corresponds to a second complete version of the content item, wherein the first version of the content item contains at least a portion of content omitted from the abridged version of the content item, and wherein the first position within the first version of the content item is within the portion of content omitted from the abridged version of the content item;

in response to a request from a user computing device for a custom version of the content item, determining the custom version of the content item based at least in part on selecting one or more portions of the first version according to the synchronization information and the request, selecting one or more portions of the abridged version according to the synchronization information and the request, and combining the one or more portions of the first version with the one or more portions of the abridged version, wherein the request is associated with a set of preferences used during selection of the one or more portions of the first version and the one or more portions of the abridged version; and transmitting information corresponding to the custom version of the content item to the user computing device for playback.

26. The computer-implemented method of claim 25, wherein the synchronization information further associates at least a portion of the abridged version of the content item to at least a portion of a third version of the content item.

27. The computer-implemented method of claim 26, wherein determining the custom version of the content item is based at least in part on combining the one or more portions of the first version, the one or more portions of the abridged version, and one or more portions of the third version.

28. The computer-implemented method of claim 25, further comprising modifying the custom version of the content item in order to remove at least one of a character, a location, explicit content, or a sub-plot within the custom version.

29. The computer-implemented method of claim 25, wherein transmitting the information corresponding to the custom version comprises transmitting a custom playback path specifying portions of each of the first version and the abridged version for playback on the user computing device.

* * * * *